United States Patent [19]

Tanaka

[11] 4,204,590
[45] May 27, 1980

[54] CONTROL MEANS FOR HYDRAULIC CLUTCHES

[75] Inventor: Shinta Tanaka, Matsuyma, Japan

[73] Assignee: Iseki Agricultural Machinery Mfg. Co., Ltd., Matsuyama, Japan

[21] Appl. No.: 912,000

[22] Filed: Jun. 2, 1978

[30] Foreign Application Priority Data

Jan. 9, 1978 [JP] Japan .......................... 53-000900[U]

[51] Int. Cl.² ............................................. F16D 19/00
[52] U.S. Cl. ...................................... 192/99 R; 74/520
[58] Field of Search ....................... 251/75; 74/520, 94, 74/100 R; 192/99 S, 99 R, 99 A, 85 AA, 87.13, 87.10, 87.19

[56] References Cited

U.S. PATENT DOCUMENTS

| 1,132,942 | 3/1915 | Jay ...................................... 251/75 X |
| 1,502,842 | 7/1924 | Beiswenger ......................... 251/75 X |
| 1,558,276 | 10/1925 | Peterson .............................. 251/75 X |
| 1,579,241 | 4/1926 | Papaslivili ........................... 251/75 X |
| 1,667,154 | 4/1928 | Heywood ............................. 251/75 X |
| 3,381,786 | 5/1968 | Gatewood ............................ 192/99 S |
| 3,517,908 | 6/1970 | Nowak ................................. 251/75 X |

*Primary Examiner*—Ronald Feldbaum
*Attorney, Agent, or Firm*—Arthur T. Fattibene

[57] ABSTRACT

Control means for a change over valve on hydraulic clutches having a lever system whereby the shift lever is rotatably connected to the fulcrum of the control lever with a toggle spring connecting both levers.

6 Claims, 3 Drawing Figures

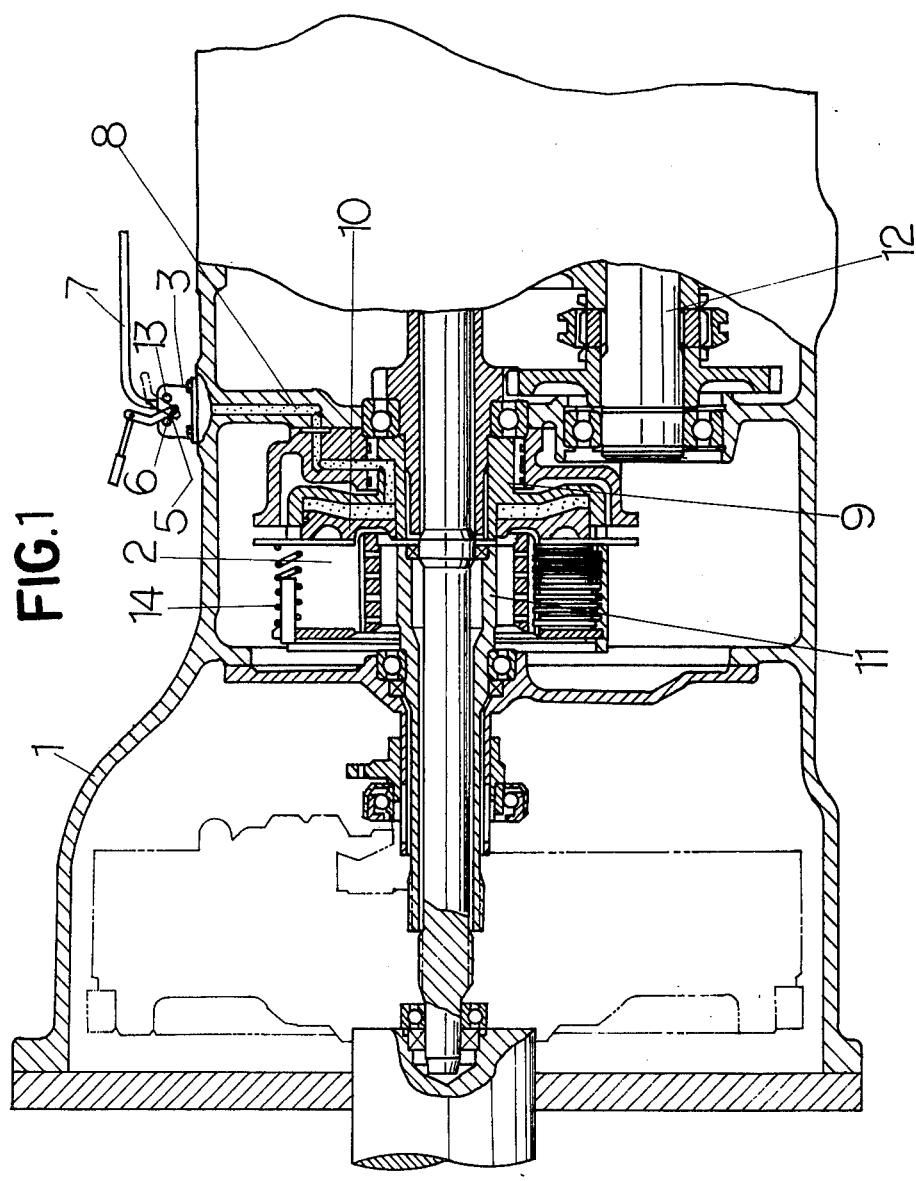

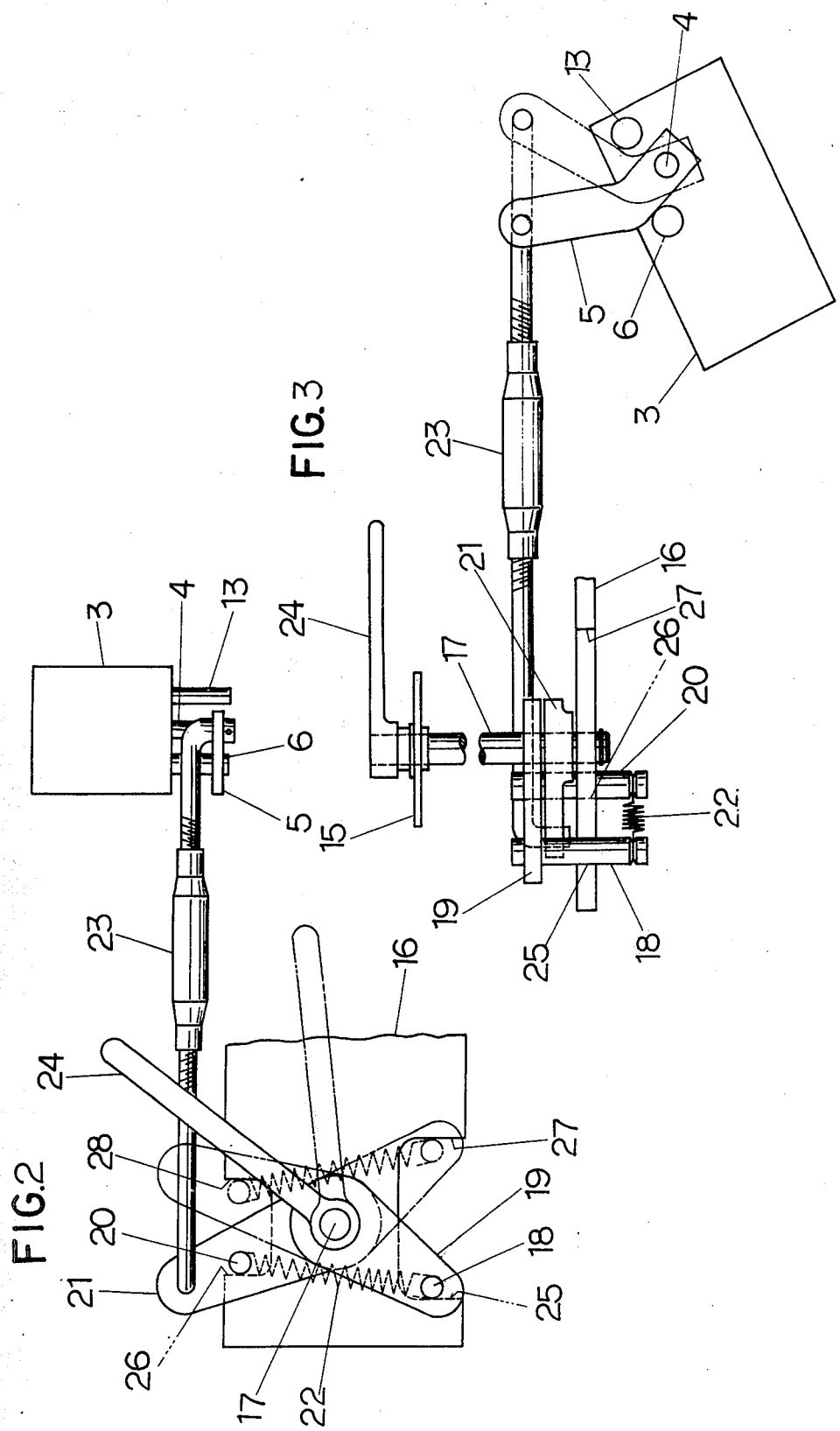

CONTROL MEANS FOR HYDRAULIC CLUTCHES

Background of the Invention

1. Field of the Invention

The present invention relates to a control means for hydraulic clutches and, more particularly, to a control means for a change-over valve for hydraulic clutches through which a pressurized oil is supplied into a hydraulic clutch whereby a rotary driving force from the engine is connected to or disconnected from a PTO drive shaft of, for example, a tractor.

2. Description of the Prior Art

A conventional hydraulic clutch of this kind is generally provided with a rotary spool type or slide spool type change-over valve to which a control handle is connected via a lever. The hydraulic clutch is let in and out while opening and closing an oil passage in the change-over valve by operating the control handle to rotate or slide the spool. When the control handle is slowly operated, the spool is rotated or slid slowly. In this case, the clutch is in a half-operated state for an unduly long time. This causes the lining of the clutch to be worn early or causes inconveniences due to the unnecessary heat generated. Especially, a clutch having a paper lining which has a low resistance to heat is easily damaged.

SUMMARY OF THE INVENTION

An object of the present invention is to eliminate the above-mentioned drawbacks encountered in the prior art control means for clutches.

Another object of the present invention is to provide a control means for hydraulic clutches which permits rotating or sliding the spool of the change-over valve at an optimum speed costantly irrespective of the operation speed of the control handle to shorten the time during which the clutch is in a half-operated state and prevent an early wear on the lining and generation of unnecessary heat.

To these ends, according to the invention, there is provided a control means for hydraulic clutches, which comprises a change-over mechanism consisting of a control lever; a shift lever rotatably connected to the fulcrum of the control lever; and a toggle spring whereby the control lever and shift lever are connected to each other, which is moved to right and left with respect to the fulcum of the control lever, and a change-over valve actuated by the shift lever of the change-over mechanism.

The above and other objects as well as advantageous features of the invention will become clear from the following description of the preferred embodiments taken in conjunction with the accompanying drawings.

BRIEF DESCRIPTION OF THE DRAWINGS

FIG. 1 is a side elevational view in cross section of a principal portion of a hydraulic clutch to which a control means according to the present invention is applied;

FIG. 2 is a side elevational view of an embodiment of the present invention; and FIG. 3 is a plan view of the embodiment as shown in FIG. 2;

DESCRIPTION OF THE PREFERRED EMBODIMENTS

The construction of the present invention will be described in detail with reference to the accompanying drawings.

Referring to FIG. 1, reference numeral 1 denotes a transmission case for a tractor; 2 a multiple disc clutch provided in the transmission case 1; 3 a rotary change-over valve provided on the outer surface of the transmission case 1; 4 a spool or stem; and 5 a valve lever mounted on the spool 4. When the valve lever 5 is engaged with a stopper 6 or when the valve lever 5 is moved to a position as shown in a solid line in FIG. 1, where the clutch is let in, pressurized oil is introduced into the change-over valve 3 through a pipe 7 and flows through an oil passage 8 to forwardly move a piston 10 fitted in a clutch cylinder 9, so that the rotary driving force of a clutch shaft 11 is transmitted from the clutch cylinder 9 to a PTO drive shaft 12. When the valve lever 5 is engaged with a stopper 13 or when the valve lever 5 is moved to a position as shown in a broken line in FIG. 1, where the clutch is let out, the change-over valve 3 is so operated as to stop the flow of the pressurized oil into the passage 8 so that the rotary drive force of the hydraulic clutch 2 is stopped due to the resilient force of a spring 14.

The control means according to the present invention for such a hydraulic clutch 2 is constructed as shown in FIGS. 2 and 3.

Referring to FIGS. 2 and 3, a shaft 17 of a control handle 24 is rotatably fixed at its base end portion to a bearing plate 16 which is disposed below a meter panel 15 of a tractor. A control lever 19, provided vertically with a support pin 18 is secured at its base portion to the shaft 17, and a shift lever 21, provided vertically with a support pin 20, is rotatably fitted at its base portion in the shaft 17. Between the support pins 18, 20, a toggle spring 22 is so provided that it is out of the axis of the shaft 17. The valve lever 5 and the shift lever 21 are pivotally connected to each other with a connecting rod 23.

The upper portion of the shaft 17 is passed through the meter panel 15, and control handle 24 is secured to the upper end of the shaft 17.

When the control handle for actuating means 24 is moved to a position as shown in a solid line in FIG. 2, where the clutch is let in, the support pins 18, 20 are engaged with stoppers 25, 26, respectively, which are provided in recesses in the bearing plate 16, and the control lever 19 works to retain by the toggle spring 22 the shift lever 21 in a position as shown in a solid line in FIG. 2.

When the control handle 24 is rotated to a position as shown in a chain line in FIG. 2, the support pin the broken is engaged with a stopper 27, and the control lever 19 reaches a position as shown in a broken line to rotate the toggle spring 22 beyond the center of the shaft 17. At this time, the toggle spring 22 causes the shift lever 21 to be rotated until the support pin 20 has been engaged with a stopper 28 or to a position as shown in a broken line in FIG. 2, where the clutch is let out, while the connecting rod 23 is rearwardly rotated until the valve lever 5 has been engaged with a stopper 13.

When the control handle 24 as shown in FIGS. 2 and 3 is then rotated, the control lever 19 is actuated to rotate the shift lever 21 via the toggle spring 22 so that the shift lever 21 is retained by the toggle spring 22 in a position where the clutch is let in or in a position where the clutch is let out. Thus, the clutch can be prevented from being unnecessarily moved.

Therefore, when the control lever 19 is rotated to allow the toggle spring 22 to be moved beyond the center of the shaft 17, the shift lever 21 is forcibly and accurately rotated in a desired direction.

Thus, the present invention provides a control means of a very simple construction for hydraulic clutches, which permits letting in and out a hydraulic clutch at a predetermined high speed at any time irrespective of the operation speed of the control handle 24 so that the hydraulic clutch is never put into a half-operated state, and which permits preventing an early wear on the lining and generation of unnecessary heat.

Incidentally, when a slide spool type change-over valve, in which a spool inserted in a sleeve is axially slidingly moved to open and close the oil passage, is used in the present invention, a push arm which can be rotated as it is always in contact with the tip of the spool may be provided, which arm has, for example, a connecting rod 31 as shown in FIG. 2 pivotally connected to the tip thereof, to obtain the same effect.

The present invention is not, of course, limited to the above-described embodiments; it may be modified in various ways within the scope of the appended claims.

What is claimed is:

1. For use with a hydraulic clutch, and a valve means operatively connected to said hydraulic clutch for controlling the flow of fluid pressure to said clutch for effecting the operation of said clutch between an operative engaged position and an inoperative disengaged position wherein said valve means is remotely disposed from said clutch the improvement of control means for uniformally activating said clutch in a positive manner so as to prohibit any delay in the transition interval of shifting said clutch between an operative and inoperative position comprising a shift lever and a control lever, pivot means for pivotally mounting said shift lever relative to said control lever, whereby said pivot means defines a fulcrum about which said levers are relatively pivoted; an actuating means connected to one of said levers to pivot therewith about said pivot means, and a spring means interconnected between said levers whereby said spring is disposed to one side of said pivot means in the engaged position of said clutch and to the other side of said pivot means in the disengaged position of said clutch and means interconnecting said valve means to said shift lever whereby the actuation of said valve means is rendered immediately responsive.

2. The invention as defined in claim 1 and including a valve lever connected to said valve means for actuating said valve means; and means interconnecting said valve lever with said shift lever whereby said valve lever and connected valve means is rendered responsive to the displacement of said shift lever.

3. The invention as defined in claim 1 wherein said actuating means is connected to said control lever and pivoted about said pivot means.

4. The invention as defined in claim 3 wherein said means interconnecting said shift lever to said valve lever comprises a connecting rod whereby the actuation of said valve lever is directly responsive to the movement of said shift lever.

5. The invention as defined in claim 1 wherein said actuating means comprises a control handle, said control handle being connected to said control lever whereby said control lever is rendered responsive to the displacement of said control handle.

6. A hydraulic clutch, a valve means connected to said clutch for controlling the flow of fluid pressure to said clutch for effecting the operation of said clutch between an operative engaged position and an inoperative disengaged position wherein said valve means is remotely disposed from said clutch and a control means for uniformally activating said clutch in a positive responsive manner so as to prohibit any delay in the transition interval of shifting said clutch between an operative and inoperative position to minimize wear, said control means comprising a shift lever and a control lever, pivot means pivotally connecting said levers whereby said shift lever can pivot relative to said control lever, a control handle connected to said control lever for effecting the displacement of said control lever between a first and second position, a spring drive interconnected between said shift lever and control lever whereby said spring drive effects the positive drive of said shift lever in response to said control lever whereby said spring means is disposed to one side of said pivot means in the first position of said control lever and to the other side of said pivot means in the second position of said control lever, said valve means including valve stem, a valve lever connected to said valve stem, and a means interconnecting said shift lever to said valve lever whereby said valve means is rendered directly responsive to the displacement of said shift lever 1 respective of the operational speed at which the control handle is actuated.

* * * * *